United States Patent
Komatsu (10) Patent No.: US 10,551,031 B2
(45) Date of Patent: Feb. 4, 2020

(54) LIGHT SOURCE APPARATUS AND PROJECTION DISPLAY APPARATUS

(71) Applicant: SONY CORPORATION, Tokyo (JP)

(72) Inventor: Yoshikazu Komatsu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/095,712

(22) PCT Filed: Feb. 28, 2017

(86) PCT No.: PCT/JP2017/007824
§ 371 (c)(1),
(2) Date: Oct. 23, 2018

(87) PCT Pub. No.: WO2017/199530
PCT Pub. Date: Nov. 23, 2017

(65) Prior Publication Data
US 2019/0137077 A1 May 9, 2019

(30) Foreign Application Priority Data
May 20, 2016 (JP) ................................ 2016-101200

(51) Int. Cl.
*F21V 7/24* (2018.01)
*F21S 2/00* (2016.01)
(Continued)

(52) U.S. Cl.
CPC .................. *F21V 7/24* (2018.02); *F21S 2/00* (2013.01); *F21V 9/30* (2018.02); *G02F 1/1335* (2013.01); *G03B 21/14* (2013.01); *H04N 5/74* (2013.01)

(58) Field of Classification Search
CPC ..... F21V 7/24; F21V 9/30; F21S 2/00; H04N 5/74; G02F 1/1335; G03B 21/14
See application file for complete search history.

(56) References Cited

U.S. PATENT DOCUMENTS

| 2012/0162614 A1 | 6/2012 | Kobayashi et al. |
| 2013/0126930 A1 | 5/2013 | Kabuki et al. |
(Continued)

FOREIGN PATENT DOCUMENTS

| JP | 2012-38452 A | 2/2012 |
| JP | 2012-141411 A | 7/2012 |
(Continued)

OTHER PUBLICATIONS

International Search Report dated May 30, 2017, in PCT/JP2017/007824, filed Feb. 28, 2017.

*Primary Examiner* — Joseph L Williams
(74) *Attorney, Agent, or Firm* — Oblon, McClelland, Maier & Neustadt, L.L.P.

(57) ABSTRACT

To implement a light source apparatus that can efficiently excite a fluorescent substance and has favorable color reproducibility.

There is provided a light source apparatus including: a first light source configured to output light having a first wavelength $\lambda_{b1}$ included in a first wavelength region; a second light source configured to output light having a second wavelength $\lambda_{b2}$ that is included in the first wavelength region, and is shorter than the first wavelength; a fluorescent substance (133) configured to be excited by the light having the first wavelength and the light having the second wavelength to emit light $\lambda_y$ in a second wavelength region; and a wavelength selection member (140) provided to face the fluorescent substance (133), and configured to reflect the light having the second wavelength $\lambda_{b2}$ among light output from the fluorescent substance (133).

10 Claims, 6 Drawing Sheets

(51) Int. Cl.
*F21V 9/30* (2018.01)
*G02F 1/1335* (2006.01)
*G03B 21/14* (2006.01)
*H04N 5/74* (2006.01)

(56) References Cited

U.S. PATENT DOCUMENTS

2013/0201456 A1   8/2013   Kashiwagi et al.
2015/0167932 A1   6/2015   Yamada et al.
2016/0241821 A1   8/2016   Kuroi et al.

FOREIGN PATENT DOCUMENTS

| | | |
|---|---|---|
| JP | 2012-150212 A | 8/2012 |
| JP | 2012-159685 A | 8/2012 |
| JP | 2013-162021 A | 8/2013 |
| JP | 5767444 B2 | 8/2015 |
| JP | 5770433 B2 | 8/2015 |
| JP | 2016-186892 A | 10/2016 |
| WO | WO 2014/038434 A1 | 3/2014 |

LIGHT SOURCE APPARATUS AND PROJECTION DISPLAY APPARATUS

TECHNICAL FIELD

The present disclosure relates to a light source apparatus used for a projection display apparatus such as a projector, and a projection display apparatus including this.

BACKGROUND ART

In recent years, projectors for projecting and displaying images upon screens and the like have been used in a variety of situations such as meeting rooms, classrooms, home theaters, and theaters. Projectors have conventionally used mercury lamps from the perspective of brightness and cost performance. However, when used for a long time, mercury lamps need regularly exchanging, and require some time to turn on. Then, from the perspective of long lifetime, high function addition, and the like, solid-state light sources each of which has a long lifetime and a wide color gamut have been attracting attention as the light sources of projectors. A solid-state light source is a light source that uses a luminous phenomenon caused by semiconductor p/n junction, and includes an LED, a laser diode (LD), and the like. Today, light source apparatuses, for example, like Patent Literatures 1 and 2 each of which irradiates a fluorescent substance material that emits, when irradiated with light in a specific wavelength region, light in a wavelength region different from that of the light with light from a solid-state light source, and uses fluorescing light are used for projectors and the like.

CITATION LIST

Patent Literature

Patent Literature 1: JP 5767444B
Patent Literature 1: JP 5770433B

DISCLOSURE OF INVENTION

Technical Problem

Here, it is desirable as a light source for a projector that it be possible to display a standard color gamut and a white color of an image display apparatus based on the DCI standard, sRGB, and the like. For example, providing a light source with the respective emission spectra of a red wavelength region, a green wavelength region, and a blue wavelength region makes it possible to display a color close to the standard above in the respective primary colors of red, green and blue, and the white color at the time when these primary colors are concurrently turned on.

It is also conceivable that a light source having such emission spectra is implemented, for example, by outputting the respective colors of red, green, and blue from a solid-state light source, but it is also possible to implement the light source by using fluorescent substances like Patent Literatures 1 and 2 above. However, in the case where fluorescent substances are used, it is difficult to balance the respective emission spectra of the red wavelength region, the green wavelength region, and the blue wavelength region. The amount of light in a specific wavelength region runs short in some cases. Then, it is desired to implement a light source apparatus that can efficiently excite a fluorescent substance and has favorable color reproducibility.

Solution to Problem

According to the present disclosure, there is provided a light source apparatus including: a first light source configured to output light having a first wavelength included in a first wavelength region; a second light source configured to output light having a second wavelength that is included in the first wavelength region, and is shorter than the first wavelength; a fluorescent substance configured to be excited by the light having the first wavelength and the light having the second wavelength to emit light in a second wavelength region; and a wavelength selection member provided to face the fluorescent substance, and configured to reflect the light having the second wavelength among light output from the fluorescent substance.

In addition, according to the present disclosure, there is provided a projection display apparatus including: a light source section; a light modulation synthesis system configured to modulate and synthesize incident light; an illumination optical system configured to guide light output from the light source section to the light modulation synthesis system; and a projection optical system configured to project an image output from the light modulation synthesis system. The light source section includes a first light source configured to output light having a first wavelength included in a first wavelength region, a second light source configured to output light having a second wavelength that is included in the first wavelength region, and is shorter than the first wavelength, a fluorescent substance configured to be excited by the light having the first wavelength and the light having the second wavelength to emit light in a second wavelength region, and a wavelength selection member provided to face the fluorescent substance, and configured to reflect the light having the second wavelength among light output from the fluorescent substance.

Advantageous Effects of Invention

According to the present disclosure as described above, it is possible to implement a light source apparatus that can efficiently excite a fluorescent substance and has favorable color reproducibility. Note that the effects described above are not necessarily limitative. With or in the place of the above effects, there may be achieved any one of the effects described in this specification or other effects that may be grasped from this specification.

MODE(S) FOR CARRYING OUT THE INVENTION

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Schematic Configuration of Projection Display Apparatus
2. Configuration of Light Source Apparatus
3. Specific Example
3.1. Fluorescent Substance Excited by Blue Light
3.2. Modification
4. Conclusion

1. SCHEMATIC CONFIGURATION OF PROJECTION DISPLAY APPARATUS

Figure 1:
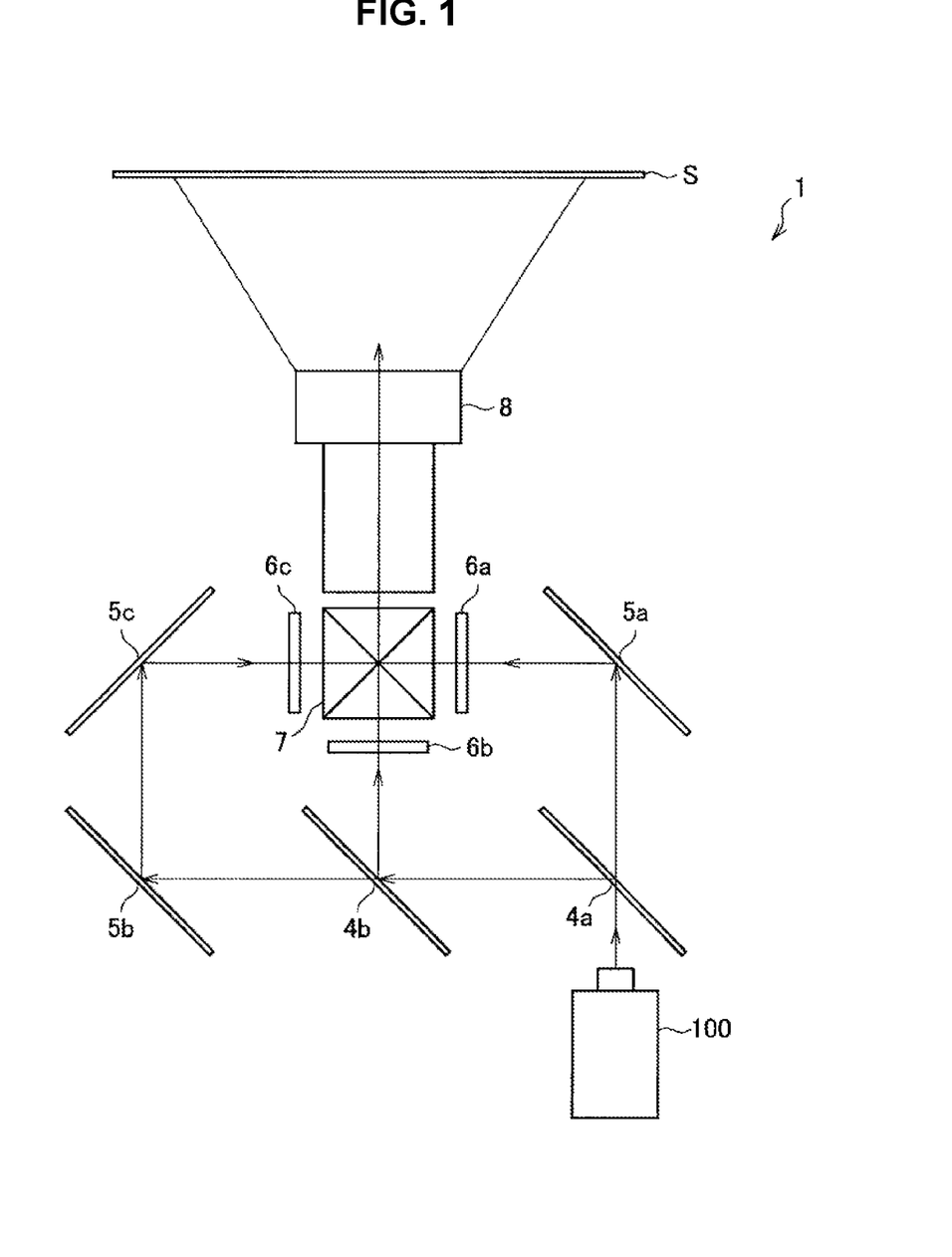
FIG. 1 is a schematic configuration diagram illustrating a configuration example of a projection display apparatus including a light source apparatus according to an embodiment of the present disclosure.

First, with reference to FIG. 1, a configuration example of a projection display apparatus 1 including a light source apparatus 100 according to an embodiment of the present disclosure as a light source section will be described. FIG. 1 is a schematic configuration diagram illustrating a configuration example of the projection display apparatus 1 including the light source apparatus 100 according to the present embodiment.

The projection display apparatus 1 illustrated in FIG. 1 is a configuration example of 3-LCD (liquid crystal display) projector. The 3-LCD projector separates white light to the three primary colors of red, green and blue, and have them pass through three respective LCDs to generate an image to be projected upon a display surface such as a screen S. The white light is output from the light source apparatus 100, which is a light source section.

More specifically, the white light output from the light source apparatus 100 is incident on a first reflecting dichroic mirror 4a that transmits, for example, only light in a blue wavelength region, and reflects light in the other wavelength regions. This causes the light in the blue wavelength region to pass through the first reflecting dichroic mirror 4a onto a reflecting mirror 5a side. Then, the light in the blue wavelength region is reflected by the reflecting mirror 5a to be incident on a liquid crystal panel 6a for blue.

Meanwhile, the light in the other wavelength regions which is reflected by the first reflecting dichroic mirror 4a is incident on a second reflecting dichroic mirror 4b. The second reflecting dichroic mirror 4b reflects only light in a green wavelength region, and transmits light in the other wavelength regions, that is, light in a red wavelength region. The light in the green wavelength region which is reflected by the second reflecting dichroic mirror 4b is incident on a liquid crystal panel 6b for green. In addition, the light in the red wavelength region which passes through the second reflecting dichroic mirror 4b is reflected by reflecting mirrors 5b and 5c, and then incident on a liquid crystal panel 6c for red.

The liquid crystal panels 6a to 6c for the respective colors modulate light incident thereon in accordance with input image signals, and generate signal light of images corresponding to RGB. As the liquid crystal panels 6a to 6c, for example, transmissive liquid crystal elements using high temperature poly-silicon TFT may be used. The signal light modulated by the respective liquid crystal panels 6a to 6c is incident on a dichroic prism 7, and synthesized. The dichroic prism 7 has a cuboid shape obtained by combining four triangular prisms so as to reflect red signal light and blue signal light, and transmit green signal light. The signal light of each color which is synthesized by the dichroic prism 7 is incident on a projection lens 8, and projected upon a display surface such as the screen S as an image.

In the projection display apparatus 1, the liquid crystal panels 6a to 6c and the dichroic prism 7 function as a light modulation synthesis system that modulates and synthesizes incident light. In addition, the reflecting dichroic mirrors 4a and 4b and the reflecting mirrors 5a to 5c function as an illumination optical system that guides light from the light source apparatus 100 serving as a light source section to the liquid crystal panels 6a to 6c included in the light modulation synthesis system. Then, the projection lens 8 functions as a projection optical system that projects an image output from the dichroic prism 7.

2. CONFIGURATION OF LIGHT SOURCE APPARATUS

The light source apparatus 100 according to the present embodiment excites a fluorescent substance with light in a predetermined wavelength region, emits light in a different wavelength region, and generates and outputs light of a predetermined color. Here, it is also possible to use part of the excitation light used to excite a fluorescent substance as part of the light output from the light source apparatus 100, but a wavelength for efficiently exciting a fluorescent substance is different from a wavelength that is optimum from the perspective of color reproducibility. Then, the present embodiment provides two light sources that output light in wavelength regions that represent substantially the same colors, and uses one of them for exciting a fluorescent substance and the other for color reproducibility.

Figure 2:
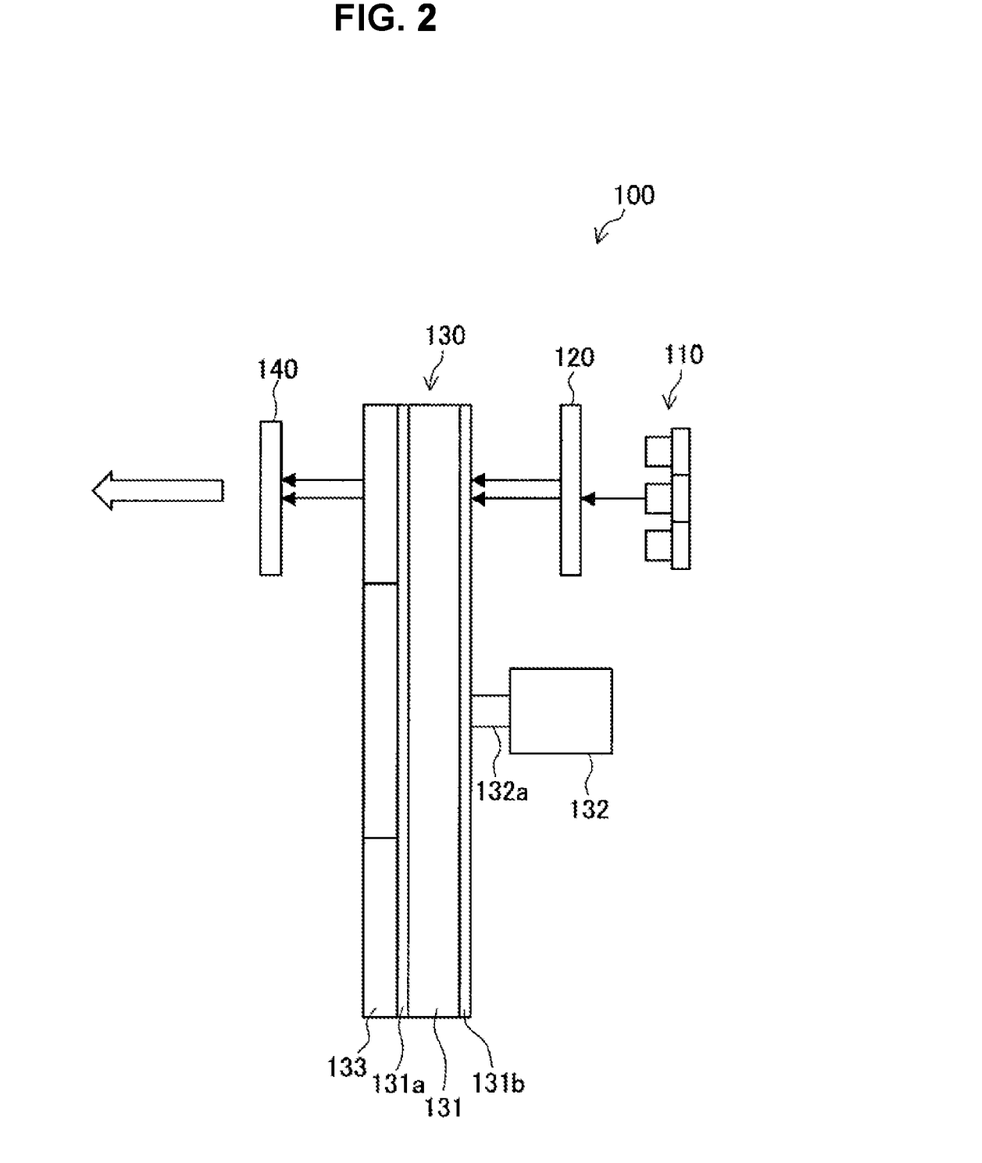
FIG. 2 is a schematic configuration diagram illustrating an example of the light source apparatus according to the embodiment.

For example, as illustrated in FIG. 2, the light source apparatus 100 like this includes a light source 110, a collimator lens 120, a wavelength conversion member 130, and a wavelength selection member 140.

Figure 3:
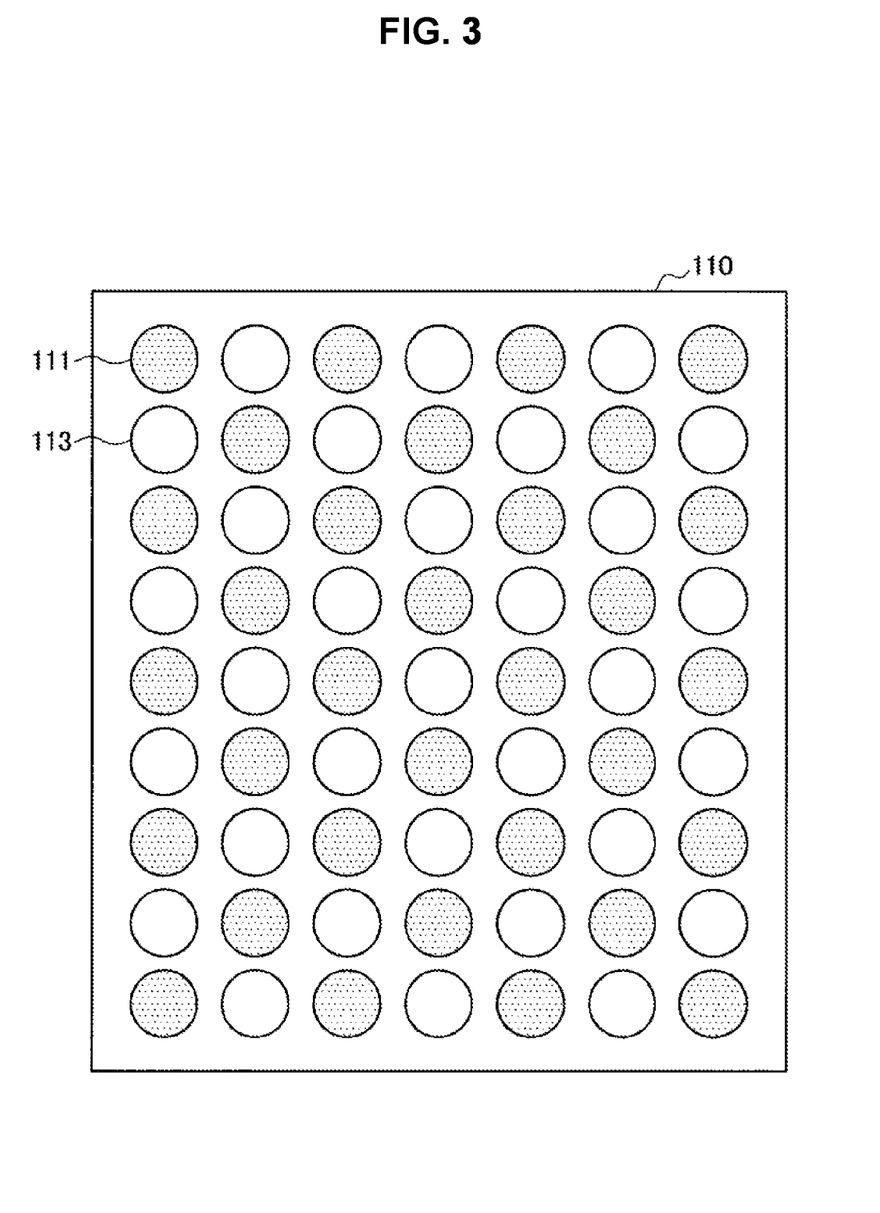
FIG. 3 is an explanatory diagram illustrating a specific example of a light source according to the embodiment.

The light source 110 is a light source section that outputs light in a first wavelength region. The light source 110 is configured to be capable of outputting light having two different wavelengths included in the first wavelength region. The light source 110 may be an array light source such as a laser diode array that includes, for example, a plurality of laser diodes. When the light source 110 is a laser diode array, for example, as illustrated in FIG. 3, first light sources 111 that output light having the first wavelength and second light sources 113 that output light having the second wavelength may be alternately arrayed in a lattice pattern. Including the first light sources 111 and the second light sources 113 together in this way makes it possible to miniaturize the light source apparatus 100. Note that the disposition and number of first light sources 111 and second light sources 113 are not limited to the example illustrated in FIG. 3. The light having two different wavelengths which is output from the light source 110 is incident on the collimator lens 120.

The collimator lens 120 is an optical member that converts the light output from the light source 110 into parallel light, and outputs it to the wavelength conversion member 130. In the case where, for example, the light source 110 is configured as a laser diode array as illustrated in FIG. 3, the collimator lens 120 may be configured as a lens array including collimator lenses corresponding to the respective light sources 111 and 113 included in the laser diode array.

The wavelength conversion member 130 is a member that converts part of the light coming from the light source 110 via the collimator lens 120 into light in a wavelength region different from the wavelength region of the incident light. To convert the wavelength region of light, a fluorescent substance is used. For example, the wavelength conversion member 130 is configured as a transmissive fluorescent substance wheel. Specifically, as illustrated in FIG. 2, the wavelength conversion member 130 includes a base material 131, a drive section 132, and a fluorescent substance 133.

The base material 131 is a member on which the fluorescent substance 133 is stacked. Light output from the light source 110 passes through the base material 131, and is incident on the fluorescent substance 133. Therefore, the base material 131 includes a transparent member such as sapphire such that the light from the light source 110 can pass. The base material 131 is, for example, disk-shaped. To the center thereof, a rotary shaft 132a of the drive section 132 is attached. The rotary shaft 132a of the drive section 132 is rotated, thereby making it possible to rotate the base material 131 as well. A laser diode used as the light source 110 like the light source apparatus 100 according to the present embodiment serves as a point light source. Therefore, heat is concentrated at the position at which light from the light source 110 is output, resulting in high temperature. Then, a rotatable configuration like the wavelength conversion member 130 according to the present embodiment makes it possible to distribute light radiation positions on the base material 131.

The incidence surface of the base material 131 on which light from the light source 110 is incident may be subjected to anti-reflective (AR) processing such that more light is incident on the fluorescent substance 133. For example, the incidence surface side of the base material 131 may be provided with a reflection preventive film 131b that reduces light reflection. Meanwhile, a reflection film 131a that reflects light in a second wavelength region to prevent the light in the second wavelength region which is emitted by the fluorescent substance 133 from propagating to the base material 131 side may be provided between the base material 131 and the fluorescent substance 133. Providing the reflection film 131a like this makes it possible to prevent the light in the second wavelength region which is emitted by the fluorescent substance 133 from being output to the base material 131 side, and reliably output the light in the second wavelength region from the light source apparatus 100.

The fluorescent substance 133 is a fluorescent substance layer stacked on the base material 131. The fluorescent substance 133 is, for example, provided on the surface opposite to the light source 110 of the base material 131. Specifically, for example, as illustrated in FIG. 2, the fluorescent substance 133 may be provided in an annular pattern concentric with the disk-shaped base material 131. The fluorescent substance 133 is provided onto the base material 131, for example, by applying screen printing to a binder mixed with a fluorescent agent. The fluorescent substance 133 is excited by the light passing through the base material 131 from the light source 110, and emits light in a wavelength region different from the wavelength region of the incident light. Note that the fluorescent substance 133 transmits part of the light output from the light source 110. Thus, when first wavelength light and second wavelength light are incident on the fluorescent substance 133 from the light source 110, the first wavelength light and the second wavelength light in the first wavelength region and the light in the second wavelength region excited and emitted by the fluorescent substance 133 are output.

The wavelength selection member 140 reflects the second wavelength light in the first wavelength region, and transmits the first wavelength light in the first wavelength region and light in the second wavelength region among the light output from the wavelength conversion member 130. As the wavelength selection member 140, for example, an optical member such as a reflecting dichroic mirror may be used. The wavelength selection member 140 may reflect all the second wavelength light, or only at least part of the second wavelength light. The second wavelength light reflected by the wavelength selection member 140 propagates to the fluorescent substance 133 side, is incident on the fluorescent substance 133, and excites the fluorescent substance 133. This allows the fluorescent substance 133 to further emit light in the second wavelength region, and it is possible to increase the amount of light in the second wavelength region for the light output from the light source apparatus 100. In this way, the second wavelength light is used as an excitation light that excites the fluorescent substance 133. Thus, the wavelength of the second wavelength light is set as a wavelength that is easy to absorb in the fluorescent substance 133, thereby making it possible to efficiently excite the fluorescent substance 133 and emit the light in the second wavelength region.

The light passing through the wavelength selection member 140 includes the first wavelength light in the first wavelength region and the light in the second wavelength region. Here, the first wavelength light has a wavelength that is absorbed in the fluorescent substance 133, but passes through the wavelength selection member 140, resulting in light that decides the color of the light in the first wavelength region which is finally output from the light source apparatus 100. Then, making light having a wavelength at which the light can correctly reproduce the color expressed by the light in the first wavelength region makes it possible to enhance the color reproducibility of the color expressed by the light in the first wavelength region. It is possible to make the color of the light output from the light source apparatus 100 closer to a desired color.

3. SPECIFIC EXAMPLE (3.1. Fluorescent Substance Excited by Blue Light)

Figure 4:
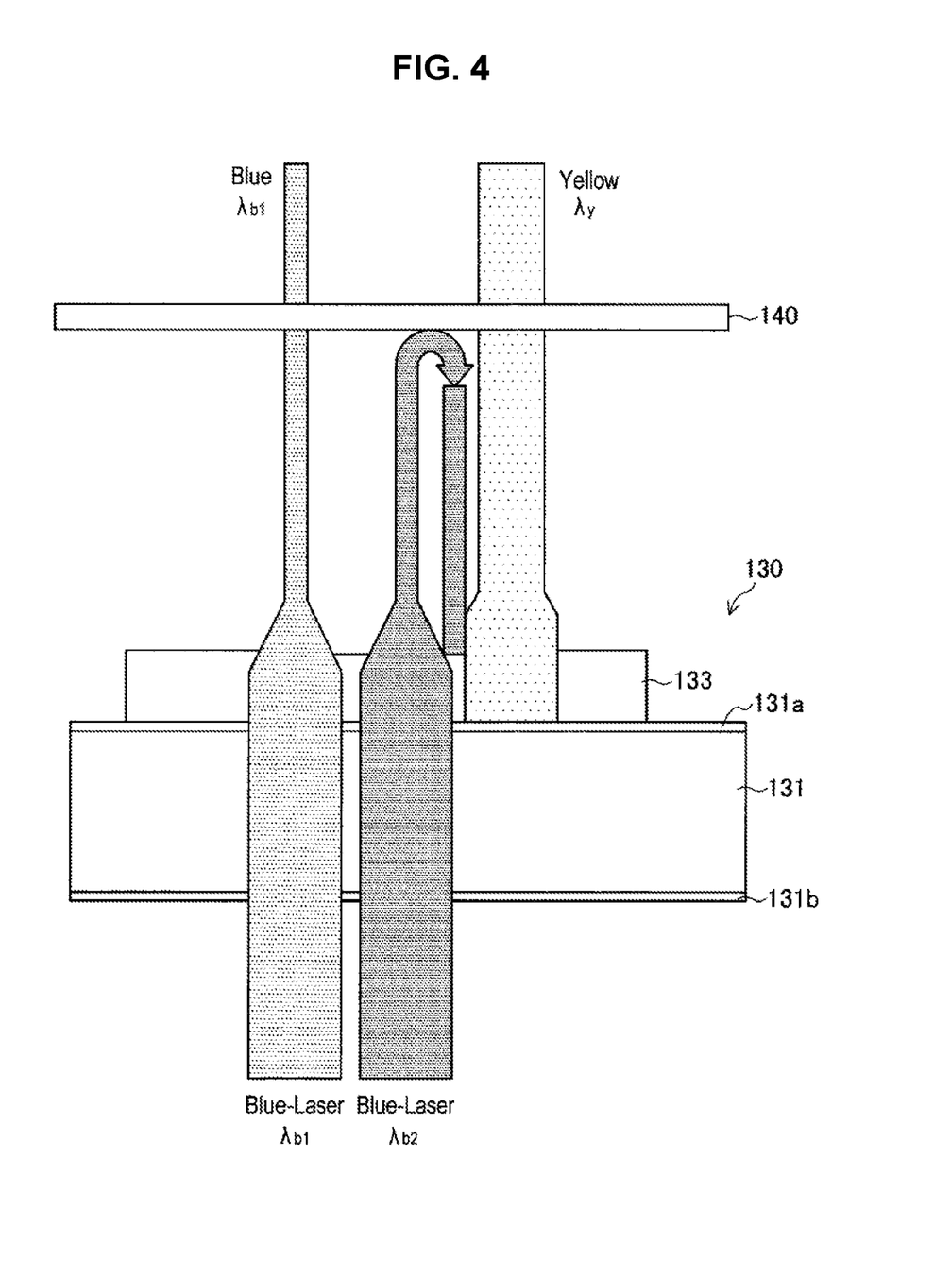
FIG. 4 is an explanatory diagram illustrating a specific example of the light source apparatus according to the embodiment.

As a specific example of the light source apparatus 100 according to the present embodiment, the case will be considered where a blue laser diode that emits light in the blue wavelength region is used as the light source 110. As illustrated in FIG. 4, the light source 110 outputs first blue light having a first wavelength $\lambda_{b1}$ from the first light source 111, and outputs second blue light having a second wavelength $\lambda_{b2}$ from the second light source 113. It is assumed that the first light source 111 is a light source that outputs light having a wavelength which is favorable for reproducibility for blue, and the first wavelength $\lambda_{b1}$ is, for example, 465 nm. Both of them are wavelengths within the blue wavelength region (approximately 400 to 500 nm) that is the first wavelength region. Meanwhile, the second light source 113 is a light source that outputs excitation light for the fluorescent substance 133. In the present example, the fluorescent substance 133 is a yellow fluorescent substance that uses excitation light to emit light including light in the green wavelength region and light in the red wavelength region. Then, the second wavelength $\lambda_{b2}$ is assumed to be a wavelength, for example, 445 nm that is easy for the yellow fluorescent substance to absorb.

Figure 5:
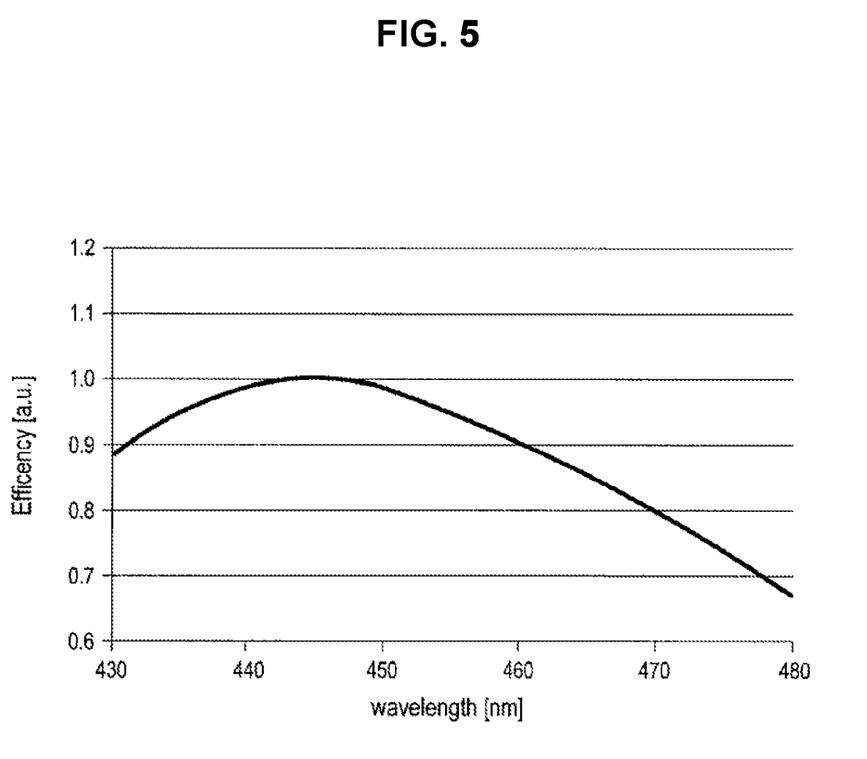
FIG. 5 is a graph illustrating a relationship between a wavelength of excitation light and excitation efficiency of a yellow fluorescent substance.

Here, FIG. 5 illustrates the relationship between the wavelength of excitation light and the excitation efficiency of a yellow fluorescent substance. The excitation efficiency represents the ratio of the amount of fluorescence at the time when a yellow fluorescent substance is excited by light having each wavelength on the basis of the amount of fluorescence emitted when a yellow fluorescent substance excited by light having a wavelength of 445 nm. As illustrated in FIG. 5, the maximum excitation efficiency is reached when excitation light has a wavelength of approximately 445 nm. This decreases the excitation efficiency as excitation light has a greater wavelength. In other words, light having the second wavelength $\lambda_{b2}$ closer to the wavelength at which the maximum excitation efficiency is reached has more favorable excitation efficiency for a yellow fluorescent substance than light having the first wavelength $\lambda_{b1}$.

As illustrated in FIG. 4, on passing through the base material 131, the first blue light having the first wavelength $\lambda_{b1}$ and the second blue light having the second wavelength $\lambda_{b2}$ are incident on a yellow fluorescent substance that is the fluorescent substance 133. The yellow fluorescent substance is excited by the first blue light and the second blue light, and emits light including light in the green wavelength region and light in the red wavelength region. The light in which light in the green wavelength region and light in the red wavelength region are blended looks yellow, so that the following also refers to the light that is emitted from the fluorescent substance and includes light in the green wavelength region and light in the red wavelength region as yellow light. A wavelength $\lambda_y$ of light included in this yellow light ranges approximately from 500 to 700 nm. Here, the yellow light emitted from the yellow fluorescent substance does not propagate to the base material 131 side, but propagates to the wavelength selection member 140 because the reflection film 131a that reflects light in the wavelength region of the yellow light is provided between the yellow fluorescent substance and the base material 131. In addition, part of the first blue light and the second blue light incident on the yellow fluorescent substance passes through the yellow fluorescent substance as it is. Thus, the first blue light, the second blue light, and the yellow light (i.e. light including light in the green wavelength region and light in the red wavelength region) are output from the yellow fluorescent substance to the wavelength selection member 140. The yellow light (Yellow) illustrated in FIG. 4 represents light including light in the green wavelength region and light in the red wavelength region.

The wavelength selection member 140 transmits the first blue light and the yellow light, and reflects the second blue light onto the yellow fluorescent substance side among the incident first blue light, second blue light, and yellow light. The second blue light reflected by the wavelength selection member 140 is incident on the yellow fluorescent substance again, excites the yellow fluorescent substance, and causes the yellow fluorescent substance to emit light including light in the green wavelength region and light in the red wavelength region. The emitted yellow light propagates to the wavelength selection member 140. In this way, the light source apparatus 100 according to the present embodiment is configured such that the second blue light used as excitation light for a yellow fluorescent substance comes and goes between the yellow fluorescent substance 133 and the wavelength selection member 140. This makes it possible to efficiently use excitation light, and increase the amount of yellow light obtained from a yellow fluorescent substance. In addition, as excitation light for a yellow fluorescent substance, the second blue light output from the second light source 113 is used. Therefore, it is possible to select, as light output from the first light source 111, the first blue light having the wavelength $\lambda_{b1}$ with high reproducibility for blue like the present example.

The first blue light having the wavelength $\lambda_{b1}$ passes through the base material 131, the yellow fluorescent substance and the wavelength selection member 140, and is output from the light source apparatus 100 along with the light that is emitted from the yellow fluorescent substance and includes light in the green wavelength region and light in the red wavelength region. This allows the light source apparatus 100 to output light that has favorable color reproducibility for blue, and has a sufficient amount of yellow light.

(3.2. Modification)

Figure 6:
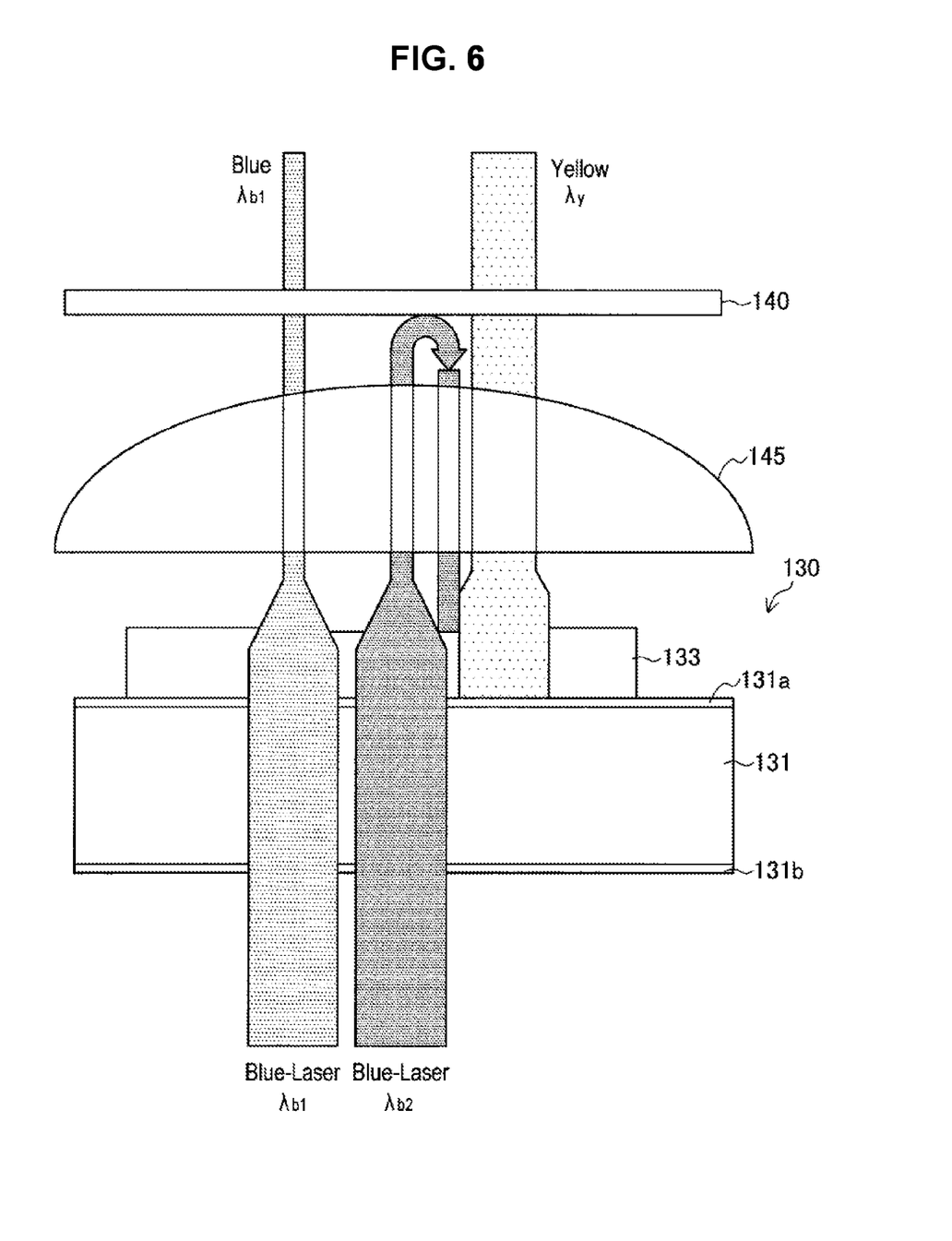
FIG. 6 is an explanatory diagram illustrating a modification of the light source apparatus according to the embodiment.

In the example of FIG. 4 above, there is provided space between the fluorescent substance 133 and the wavelength selection member 140, but the present disclosure is not limited to this example. For example, the fluorescent substance 133 may be brought into contact with the wavelength selection member 140. As illustrated in FIG. 6, the collimator lens 145 may be provided between the fluorescent substance 133 and the wavelength selection member 140. In this case, the collimator lens 145 functions to condense the second blue light reflected by the wavelength selection member 140 on the fluorescent substance 133. This makes it possible to make the second blue light serving as excitation light for the fluorescent substance 133 reliably incident on the fluorescent substance 133, and cause the fluorescent substance 133 to efficiently emit light.

Further, the collimator lens 145 may be disposed not only between the fluorescent substance 133 and the wavelength selection member 140 as illustrated in FIG. 6, but also on the output side of the wavelength selection member 140 (i.e. opposite side to the fluorescent substance 133). In addition, the incidence surface of the collimator lens 145 on which light is incident from the fluorescent substance 133 side may have a function of reflecting the second wavelength light. For example, a wavelength selection film that reflects the second wavelength light may be applied to the incidence surface of the collimator lens 145. In this case, the wavelength selection member 140 may be provided, or may not be provided.

4. CONCLUSION

The above describes the configuration of the light source apparatus according to an embodiment of the present invention. According to the present embodiment, to excite a fluorescent substance with light in a predetermined wavelength region, cause the fluorescent substance to emit light in different wavelength regions, and generate and output light having a desired color, there are provided a light source that outputs light for a predetermined color among light output from a light source apparatus, and a light source for excitation light for the fluorescent substance. This makes it possible to select the wavelength corresponding to a characteristic required from each light source, and achieve both the excitation efficiency of a fluorescent substance and reproducibility for a predetermined color. In addition, disposing these light sources together also makes it possible to miniaturize the light source apparatus.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the embodiment above, the light source apparatus 100 is configured with the wavelength conversion member 130 as a transmissive fluorescence wheel, but the present technology is not limited to this example. For example, the wavelength conversion member 130 may be a reflecting fluorescence wheel.

In addition, as an example of the embodiment above, the case is demonstrated where the blue wavelength region is the first wavelength region, the wavelength region of light including light in the green wavelength region and light in the red wavelength region is the second wavelength region, and a yellow fluorescent substance is the fluorescent substance, but the present disclosure is not limited to this example. It is sufficient to decide the wavelength region of light output from each light source and the characteristics of a fluorescent substance in accordance with shades of light realized by the light source apparatus.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A light source apparatus including:

a first light source configured to output light having a first wavelength included in a first wavelength region;

a second light source configured to output light having a second wavelength that is included in the first wavelength region, and is shorter than the first wavelength;

a fluorescent substance configured to be excited by the light having the first wavelength and the light having the second wavelength to emit light in a second wavelength region; and a wavelength selection member provided to face the fluorescent substance, and configured to reflect the light having the second wavelength among light output from the fluorescent substance.

(2)

The light source apparatus according to (1), in which the first wavelength region is a blue wavelength region, and the second wavelength region is a wavelength region of light including light in a green wavelength region and light in a red wavelength region, and the fluorescent substance is a yellow fluorescent substance that is excited by the light in the blue wavelength region to emit the light including the light in the green wavelength region and the light in the red wavelength region.

(3)

The light source apparatus according to (1) or (2), in which the first wavelength of the first wavelength region is 465 nm, and the second wavelength is 445 nm.

(4)

The light source apparatus according to any one of (1) to (3), in which the light source apparatus is provided as an array light source in which a plurality of the first light sources and a plurality of the second light sources are arrayed.

(5)

The light source apparatus according to any one of (1) to (4), in which the fluorescent substance is provided on a base material that is configured to be rotatable, and the light having the first wavelength and the light having the second wavelength are incident on the fluorescent substance via the base material.

(6)

The light source apparatus according to (5), in which a reflection film is provided between the fluorescent substance and the base material, the reflection film reflecting the light in the second wavelength region.

(7)

The light source apparatus according to (5) or (6), in which an incidence surface of the base material for the light having the first wavelength and the light having the second wavelength is provided with a reflection preventive film that prevents light from being reflected.

(8)

The light source apparatus according to any one of (1) to (7), in which a collimator lens is provided between the fluorescent substance and the wavelength selection member.

(9)

The light source apparatus according to (8), in which a surface of the collimator lens on the fluorescent substance side is provided with a wavelength selection film that reflects the light having the second wavelength.

(10)

A projection display apparatus including:

a light source section;

a light modulation synthesis system configured to modulate and synthesize incident light;

an illumination optical system configured to guide light output from the light source section to the light modulation synthesis system; and a projection optical system configured to project an image output from the light modulation synthesis system, in which the light source section includes a first light source configured to output light having a first wavelength included in a first wavelength region, a second light source configured to output light having a second wavelength that is included in the first wavelength region, and is shorter than the first wavelength, a fluorescent substance configured to be excited by the light having the first wavelength and the light having the second wavelength to emit light in a second wavelength region, and a wavelength selection member provided to face the fluorescent substance, and configured to reflect the light having the second wavelength among light output from the fluorescent substance.

REFERENCE SIGNS LIST

1 projection display apparatus
100 light source apparatus
110 light source
111 first light source
113 second light source
120, 145 collimator lens
130 wavelength conversion member
131 base material
131*a* reflection film
131*b* reflection preventive film
132 drive section 132a rotary shaft
133 fluorescent substance
140 wavelength selection member

The invention claimed is:

1. A light source apparatus comprising:
a first light source configured to output light having a first wavelength included in a first wavelength region;
a second light source configured to output light having a second wavelength that is included in the first wavelength region, and is shorter than the first wavelength;
a fluorescent substance configured to be excited by the light having the first wavelength and the light having the second wavelength to emit light in a second wavelength region; and
a wavelength selection member provided to face the fluorescent substance, and configured to reflect the light having the second wavelength among light output from the fluorescent substance.

2. The light source apparatus according to claim 1, wherein
the first wavelength region is a blue wavelength region, and the second wavelength region is a wavelength region of light including light in a green wavelength region and light in a red wavelength region, and
the fluorescent substance is a yellow fluorescent substance that is excited by the light in the blue wavelength region to emit the light including the light in the green wavelength region and the light in the red wavelength region.

3. The light source apparatus according to claim 1, wherein
the first wavelength of the first wavelength region is 465 nm, and the second wavelength is 445 nm.

4. The light source apparatus according to claim 1, wherein
the light source apparatus is provided as an array light source in which a plurality of the first light sources and a plurality of the second light sources are arrayed.

5. The light source apparatus according to claim 1, wherein
the fluorescent substance is provided on a base material that is configured to be rotatable, and
the light having the first wavelength and the light having the second wavelength are incident on the fluorescent substance via the base material.

6. The light source apparatus according to claim 5, wherein
a reflection film is provided between the fluorescent substance and the base material, the reflection film reflecting the light in the second wavelength region.

7. The light source apparatus according to claim 5, wherein
an incidence surface of the base material for the light having the first wavelength and the light having the second wavelength is provided with a reflection preventive film that prevents light from being reflected.

8. The light source apparatus according to claim 1, wherein
a collimator lens is provided between the fluorescent substance and the wavelength selection member.

9. The light source apparatus according to claim 8, wherein
a surface of the collimator lens on the fluorescent substance side is provided with a wavelength selection film that reflects the light having the second wavelength.

10. A projection display apparatus comprising:
a light source section;
a light modulation synthesis system configured to modulate and synthesize incident light;
an illumination optical system configured to guide light output from the light source section to the light modulation synthesis system; and
a projection optical system configured to project an image output from the light modulation synthesis system, wherein
the light source section includes
a first light source configured to output light having a first wavelength included in a first wavelength region,
a second light source configured to output light having a second wavelength that is included in the first wavelength region, and is shorter than the first wavelength,
a fluorescent substance configured to be excited by the light having the first wavelength and the light having the second wavelength to emit light in a second wavelength region, and
a wavelength selection member provided to face the fluorescent substance, and configured to reflect the light having the second wavelength among light output from the fluorescent substance.

* * * * *